United States Patent [19]
Smith

[11] Patent Number: 4,576,499
[45] Date of Patent: Mar. 18, 1986

[54] BALL AND SOCKET JOINTS WITH WEAR INDICATOR

[75] Inventor: Joseph E. Smith, Birmingham, Mich.

[73] Assignee: O & S Manufacturing Company, Whitmore Lake, Mich.

[21] Appl. No.: 431,635

[22] Filed: Sep. 30, 1982

Related U.S. Application Data

[63] Continuation-in-part of Ser. No. 251,253, Apr. 6, 1981, Pat. No. 4,419,027, and a continuation-in-part of Ser. No. 251,254, Apr. 6, 1981, Pat. No. 4,415,291, and a continuation-in-part of Ser. No. 263,778, May 14, 1980, Pat. No. 4,431,328, and a continuation-in-part of Ser. No. 292,634, Aug. 13, 1981, Pat. No. 4,466,755.

[51] Int. Cl.$^4$ ................................................ B25G 3/00
[52] U.S. Cl. ........................................ 403/27; 403/36; 403/138; 403/144
[58] Field of Search .................... 403/27, 36, 39, 144, 403/138

[56] References Cited

U.S. PATENT DOCUMENTS

| | | | |
|---|---|---|---|
| 2,707,645 | 5/1955 | Moskovitz | 403/38 |
| 3,103,377 | 9/1963 | Scheublein, Jr. et al. | 403/75 |
| 3,208,290 | 9/1965 | Mathues et al. | 403/36 X |
| 3,370,872 | 2/1968 | Meyer | 403/125 |
| 3,790,195 | 2/1974 | Herbenar | 403/124 |
| 3,813,178 | 5/1974 | Herbenar et al. | 403/138 X |
| 4,017,197 | 4/1977 | Farrant | 403/27 |
| 4,358,211 | 11/1982 | Goodrich, Jr. et al. | 403/27 |

FOREIGN PATENT DOCUMENTS

| | | | |
|---|---|---|---|
| 2162597 | 11/1972 | Fed. Rep. of Germany | 403/122 |
| 1050887 | 9/1953 | France | 403/124 |

OTHER PUBLICATIONS

Wear Indicator Ball Joint for A.M.C. (Pacer), Model Application 1975-80 and Inspection Procedure.
Wear-Indicator Ball Joints for Chrysler K and L Cars, Model Application 1981, Inspection Procedure.
Wear-Indicator Ball Joints for G.M. and Ford, General Model Applications G.M. Cars 1973-81, Ford Cars 1978-81, Inspection Procedure.

*Primary Examiner*—Andrew V. Kundrat
*Attorney, Agent, or Firm*—Hauke and Patalidis

[57] ABSTRACT

A wear indicator for knuckle or swivel joints of the ball and socket type wherein the spherical surfaces in swivelling engagement are urged in bearing engagement by a retainer member accomplishing the double function of holding the ball and the socket in assembly and of applying a pre-load force to the ball to prevent vibration and rattle and to compensate for wear of the bearing surfaces. The wear indicator is in the form of an elongate member attached to the pre-load retainer member at a portion thereof which is progressively movable in the direction of wear of the bearing surfaces of the joint for maintaining the pre-load pressure upon the bearing surfaces. The elongate member which, preferably, takes the form of a grease fitting in lubricated joints or the form of a rod in dry or in lubricated-for-life, projects a predetermined distance from an end of the socket when the joint is new, and retracts at least flush or even with a reference plane, such as the plane of the socket end, when the joint has worn to a degree requiring replacement. Alternatively, the tip of the elongate member projects through an aperture in a closure plate mounted at the end of the socket when the joint is new, and retracts with its tip at least flush with the outer surface of the plate when the wear of the joint is such as to require replacement, thus forming a visual and tactile wear indicator.

16 Claims, 18 Drawing Figures

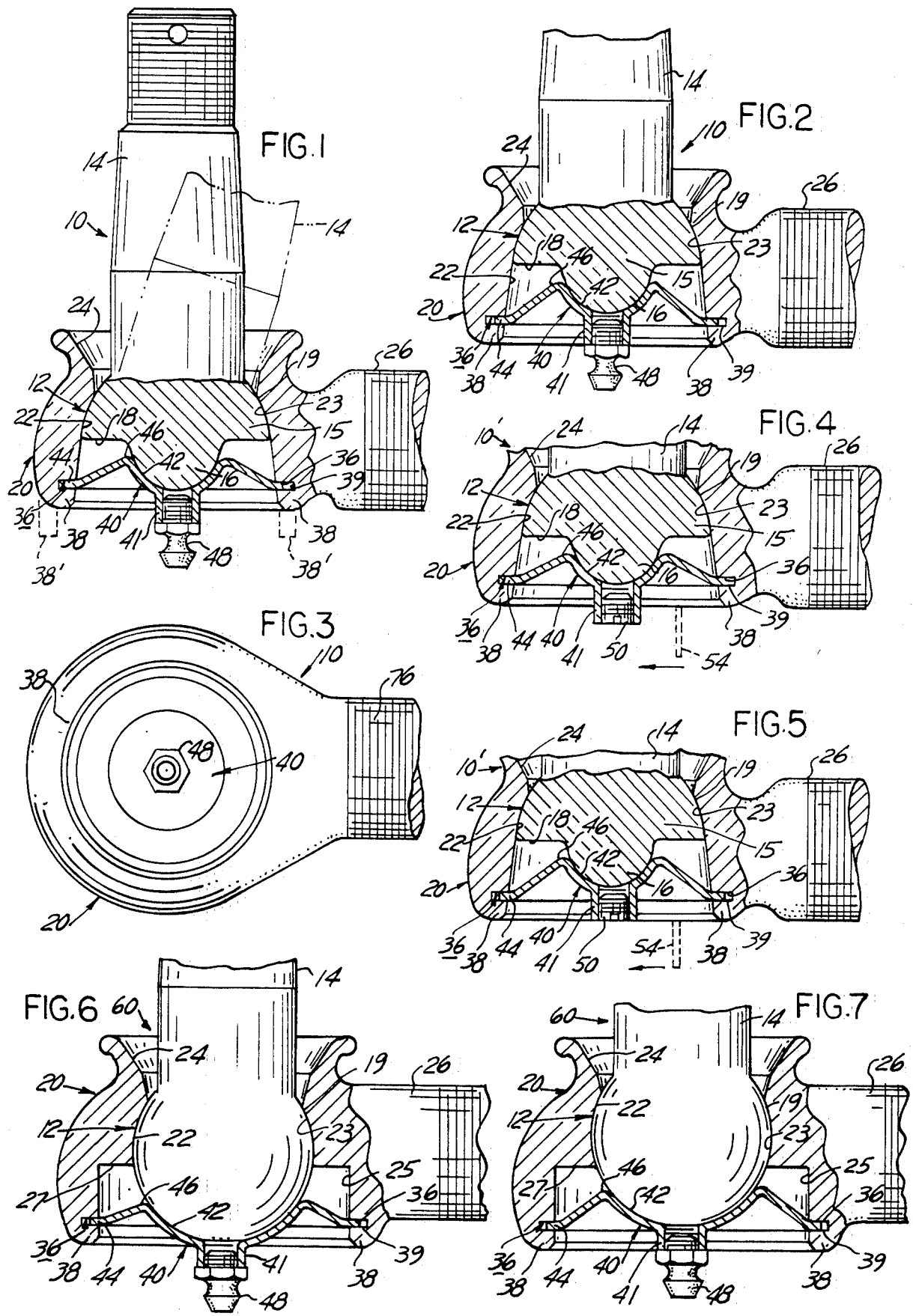

BALL AND SOCKET JOINTS WITH WEAR INDICATOR

CROSS REFERENCE TO RELATED APPLICATIONS

This application is a continuation-in-part of application Ser. No. 251,253, filed Apr. 6, 1981 now U.S. Pat. No. 4,419,027, Ser. No. 251,254, filed Apr. 6, 1981 now U.S. Pat. No. 4,415,291, Ser. No. 263,778 filed May 14, 1980 now U.S. Pat. No. 4,431,328, and Ser. No. 292,634 in turn a C.I.P. of Ser. No. 263,778, and, filed Aug. 13, 1981 now Pat. No. 4,466,755, all assigned to the same assignee as the preset application.

BACKGROUND OF THE PRESENT INVENTION

The present invention relates to a bearing assembly for knuckle or swivel joints in general, and more particularly to ball and socket joints of very simple structure provided with a wear indicator.

Knuckle or swivel joints of the ball and socket type are commonly used in motor vehicle steering tie rod assemblies, in drag links, torque rods and like structures, in which there is a requirement for transmitting a force from a member to another while permitting one member to swivel or pivot relative to the other.

Knuckle or swivel joints of the ball and socket type consist generally of a stud terminating in a full or partial ball disposed within a socket member in swivelling slidable engagement with a conforming concave spherical segment of the socket member. The engaged bearing surfaces of the ball and of the socket are biased, or pre-loaded, towards each other such as to provie a relatively tight assembly eliminating play and rattle and automatically compensating for wear of the bearing surfaces.

Ball and socket knuckle or swivel joints are of the dry type, or of the prelubricated type without lubricator for replenishing the lubricant, or are provided with a grease fitting permitting to occasionally replenish the supply of lubricant, for example during normal servicing of a motor vehicle. Whatever the type of ball and socket joints installed on a motor vehicle, progressive wear and tear of the bearing surfaces in constant preloaded swivelling engagement gradually proceed to a state beyond the capability of the pre-load structure to compensate for wear, to the point where play and rattle begin to appear under excessive loads which are beyond the capability of the wear compensation pre-load to accommodate. Although such excessive wear, which requires replacement of the joint, may be estimated by an experienced mechanic while servicing a motor vehicle, through visual inspection of the joints, or by means of appropriate gauges, or simply by manually shaking the steering tie rod assembly, for example, and approximately judging the amount of play and rattle, and the looseness of the joints, it is evident that such a procedure of checking for wear leaves much to be desired.

SUMMARY OF THE INVENTION

The present invention has for principal object to provide ball and socket joints of all types with a wear indicator requiring no special technique for checking for wear, such as the gauges used for that purpose, and permitting to determine the amount of wear of the joints principally by visual inspection, for the purpose of replacing the joint prior to the end of its useful life, for example prior to having been subjected to an amount of wear which could lead to unsafe conditions such as excessive play in a motor vehicle steering mechanism, or actual accidental separation of the joint through pulling of the ball member from its socket.

In addition, the present invention contemplates a particular simple structure for a ball and socket knuckle or swivel joint with built-in wear indicator, and applicable to nonlubricated joints as well as lubricated joints provided with a grease fitting.

These and other objects of the present invention will become apparent to those skilled in the art when the following description of the best modes contemplated for practicing the invention is read in conjunction with the accompanying drawing, wherein like numerals relate to identical or equivalent elements, and in which:

BRIEF DESCRIPTION OF THE DRAWING

FIG. 1 is a structural example of a ball and socket joint provided with a wear indicator according to the present invention, illustrated in longitudinal section;

FIG. 2 is a view similar to FIG. 1 but showing the relative position of the elements after the amount of wear of the joint has reached a predetermined state requiring replacement of the joint;

FIG. 3 is a bottom view of the joint of FIGS. 1-2;

FIGS. 4 and 5 are views similar to FIGS. 1 and 2, but showing a modified structure;

FIGS. 6 and 7 are views similar to FIGS. 1 and 2, but showing a further modified structure in the form of a full ball and socket joint.

DETAILED DESCRIPTION OF THE PREFERRED EMBODIMENTS

Figure 8:
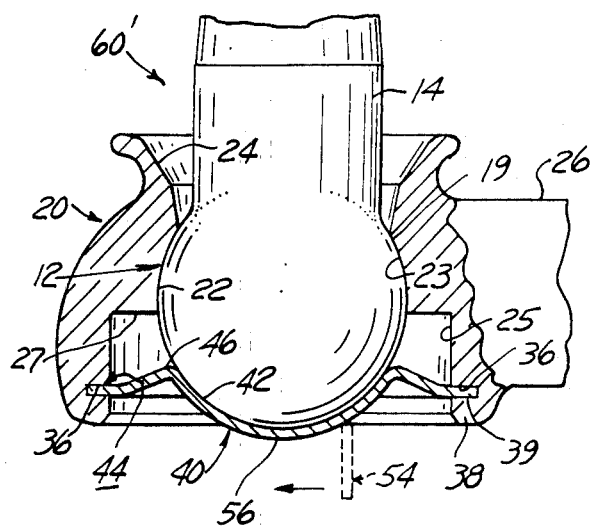
FIGS. 8 and 9 are views similar to FIGS. 6 and 7 but showing a modification thereof.

Referring to the drawings in greater detail, and first to FIGS. 1-3, the example of structure shown therein for a knuckle or swivel joint 10 modified according to the present invention is substantially as disclosed in details in application Ser. No. 251,254, and comprises a cold-headed ball 12 having a projecting stud 14 integrally formed or welded at one end thereof. The ball 12 has a main body portion 15 of relatively large diameter proximate its integral junction with the stud 14. The side of the ball 12 diametrically opposite to the stud 14 has a hemispherical protrusion 16 of substantially smaller diameter than the ball main body portion 15, a generally flat annular shoulder 18 surrounding the hemispherical protrusion 16. The main portion 15 of the ball 12, between the annular shoulder 18 and the stud 14, is formed with a spherical surface 19. The ball 12 is disposed in a socket 20 having a bore 22 and an integrally formed shank 26 projecting from an outside surface of the socket. The bore 22 is formed with a spherical surface 23 to mate with the spherical surface 19 on the main portion 15 of the ball 12. The socket bore 22 has an open end 24 through which projects the stud 14.

The bore 22 of the socket 20 terminates at its other end with an annular shoulder 36 and an annular lip 38 forming a circular groove 39 receiving a disk-like pre-load and retainer cap 40. The retainer cap 40 is preferably a stamping of spring steel formed with a centrally disposed threaded neck 41, a partially spherical recess or cavity 42, and a peripheral flange 44, a reverse bend 46 being formed between the recess 42 and the peripheral flange 44. The neck 41 threadably receives a grease fitting 48, as shown, or other lubricator plug.

As illustrated at FIG. 1, the socket 20 is originally provided with a straight lip flange or rim 38' shown in dashed lines, and the three principal parts forming the knuckle or swivel joint 10 are assembled together by placing the ball 12 in the bore 22 of the socket 20, disposing the retainer cap 40 with its partially spherical recess 42 in engagement with the hemispherical protrusion 16 of the ball and, by a swaging operation, bending over the socket rim 38' such as to capture the edge of the peripheral flange 44 of the retainer cap 40 in the circular groove 39, between the socket annular shoulder 36 and the socket bent-over annular lip 38. It will be readily appreciated that, during the swaging operation, the edge of the peripheral flange 44 is somewhat flattened elastically thus resulting in applying a pre-load to the assembled parts that causes the partially spherical surface 19 of the ball main portion 15 to firmly engage the partially spherical surface 23 of the socket bore 22, and which also results in firmly applying the partially spherical surface of the recess 42 of the retainer cap 40 firmly in engagement with the corresponding surface of the hemispherical protrusion 16 of the ball 12, Therefore, in addition to providing for finish assembly of the parts, the swaging operation causes a pre-load to be exerted on the bearing surfaces in mutual swivelling engagement, which prevents rattles and which automatically compensates for play due to normal wear of the joint, in operation after installation.

The center of the spherical surface 19 of the ball main body portion 15 and the center of the ball hemispherical protrusion 16 coincide such that the knuckle and swivel joint of the invention can be angulated to any extreme position, such as illustrated in phantom line at FIG. 1, without any binding.

When the ball and socket joint 10 is new, FIG. 1, the grease fitting 48 projects a certain distance beyond the plane of the annular lip 38. After the knuckle and swivel joint 10 has been in service for a period of time, progressive wear of the swivelling bearing surfaces in engagement, including more particularly the wear of the spherical peripheral surface 19 of the ball main body portion 15 and of the corresponding spherical surface 23 of the socket bore 22, and relatively less importantly the wear of the partially spherical surface of the recess 42 of the pre-load retainer cap 40 and of the corresponding spherical surface of the ball hemispherical protrusion 16, causes the grease fitting 48 to be progressively displaced in the direction of the pre-load force exerted by the retainer cap 40, tending to constantly urge in engagement the bearing surfaces.

This results in the neck 41 of the retainer cap 40 to progressively sink within the end of the socket bore 22 closed by the retaining cap 40, as illustrated at FIG. 2. The amount of wear of the joint bearing surfaces is proportionally represented by the position of the grease fitting 48 relative to the plane of the annular lip 38, such that the position of the grease fitting 48 provides an indication of the degree of wear of the knuckle or swivel joint 10. Any arbitrary distinct visual reference may be used to determine, with a given degree of safety, initial closeness to the end of the joint useful life. For example, when the neck 41 of the retainer cap 40 in which is threadably fitted the grease fitting 48 is flush with or below the plane of the annular lip 38, this may be arbitrarily considered to be the indication that the knuckle or swivel joint 10 has reached the end of its useful life and needs to be replaced. By appropriate dimensioning of the elements of the swivel or knuckle joint 10, and more particularly by appropriate dimensioning of the length of the retainer cap neck 41, a relatively accurate wear gauge is provided which, by simple visual inspection, permits to determine the amount of wear of the swivel or knuckle joint 10, and to effectuate replacement by a new joint assembly prior to the wear reaching a limit beyond the capability of the pre-load retainer cap 40 to compensate for, through the pre-load force applied by the retainer cap 40 to the swivelling bearing surfaces, and at a safe stage prior to reaching excessive wear resulting in a reduction of the diameter of the main portion 15 of the ball 12 contemporaneously with an increase in diameter of the spherical surface 23 in the socket bore 22 that may cause the stud 14 and ball 12 assembly to separate from the socket member 22 by pulling through the open end 24 of the socket member. The reference position for indicating the limit of permissible wear is therefore, in the example chosen, the position corresponding to the base, FIG. 2, of the grease fitting 48 being flush with the plane of the annular lip 38, which may be checked by visual sighting or by way of a ruler placed across the lip 38 in close proximity with the grease fitting base.

Referring now to FIGS. 4-5, the structure of the ball and socket joint 10' illustrated therein is identical to that of FIGS. 1-3, except that the structure does not include a grease fitting, the grease fitting being replaced by a plug 50 fitted in the neck 41 disposed at the center of the pre-load retainer cap 40. The ball and socket joint 10' is of the dry type, or of the lubricated-for-life type which is provided, during assembly with a supply of lubricant which needs not be replenished during the useful life of the joint. The ball and socket joint 10' of FIGS. 4-5 consists of an assembly of the same elements as the joint 10 of FIGS. 1-3, with the mentioned exception of the grease fitting being replaced by a plug 50, for the purpose of reducing inventory of parts, and for purpose of utilizing the neck 41 of the retainer cap 40 as a built-in wear indicator. By correct dimensioning of the length of the neck 41, the neck 41 is transformed into a wear indicator which, when the ball and socket joint 10' is new, projects an appropriate distance from the plane of the annular lip 38 holding the retainer and pre-load cap 40 in position in the groove 36 at the end of the bore 22 in the socket member 20. The wear of the joint 10' may be checked visually by sighting the retainer cap neck 41 with the plane of the annular rim 38 or by using a straight edge such as a ruler 54 and displacing the straight edge across the face of the lip 38, diametrically. If the retainer cap neck 41 projects beyond the plane of the end of the socket 20 as represented by the annular lip 38, it is prevented from being displaced diametrically as a result of engagement with the neck 41, FIG. 4. However, if the ball and socket joint 10' has worn beyond its useful life, the straight edge 54, FIG. 5, can be freely displaced across the face of the lip 38 without interference caused by engagement with the protruding neck 41 as a result of the wear of the bearing surfaces in engagement having been compensated by the elastic deformation of the closure cap 40 in a direction applying the pre-load force to the bearing surfaces and having retracted the retainer cap neck 41 beyond the plane of the annular surface of the lip 38.

The principles of the invention are also applicable to full ball and socket knuckle or swivelling joints, an example of which is illustrated at 60 at FIGS. 6–7. The structure of the ball and socket joint 60 comprises a full ball 12 integrally formed, or welded, on the end of a stud 14. The ball 12 is spherical and is disposed in a socket 20 having a bore 22 provided with a spherical surface portion 23 engaged by the spherical surface 19 of the ball 12. The socket 20 has an outwardly diverging frusto-conical open end portion 24 through which projects the stud 14. The socket bore 22 has an enlarged cylindrical bore portion 25, an annular step surface 27 being formed between the spherical portion 23 of the bore 22 and the enlarged cylindrical bore portion 25. The surface of the annular step 27 is an imaginary plane intersecting the spherical surface 19 of the ball 12 substantially along a diameter. The pre-load retainer cap 40 is structurally identical to the retainer cap 40 of FIGS. 1–3, except that its spherical recess 42 is of a size to accommodate the full ball 12. The ball 12 may be provided with a flat surface, not shown, disposed such as to correspond to the outlet of the grease fitting 48, and resulting in providing a space which, after filling with grease, acts as a grease reservoir, in addition to the reservoir of lubricant formed in the socket enlarged bore portion 25 between the pre-load retainer cap and the annular surface 27 in the socket 20.

The retainer cap neck 41 and the grease fitting 48 of the full ball and socket joint 60 together, through proper dimensioning of the elements, act as a wear indicator. When the ball and socket joint 60 is new, the pre-load retainer cap neck 41 and grease fitting 48 project a certain distance from the plane of the annular lip 38, FIG. 6, while, after the joint has worn beyond its useful life, the retainer cap neck 41 and the grease fitting 48 have become displaced in the direction in which pre-load is applied by the retainer cap 40 to the bearing surfaces in engagement to a predetermined position easily visually identifiable. Such predetermined position is, for example, the base of the hexagonal head of the grease fitting 48 being even with the plane of the annular lip 38, indicating that the worn ball and socket joint 60 must be replaced by a new one.

Figure 9:
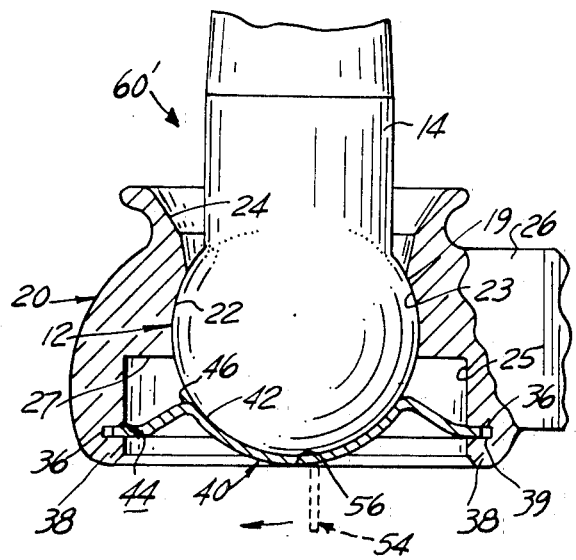

The structure of the full ball and socket joint 60' of FIGS. 8–9 is alike that of FIGS. 6–7, except that the pre-load retainer cap neck 41 and the grease fitting 48 of the structure of FIGS. 6–7 are omitted. The full ball and socket joint 60' of FIGS. 8–9 is of the dry type or of the prelubricated type, or lubricated-for-like type. As a result of appropriate dimensioning of the elements, including the size of the ball 12 and the height or thickness of the socket 20, more particularly as to the distance separating the annular surface 27 in the socket bore 22 from the groove 36 in which is disposed the flange 44 of the pre-load retainer cap 40, and the thickness of the spring steel of which the retainer cap 40 is made, when the full ball and socket joint 60' is new a portion of the exterior surface of the retainer cap 40, as shown at 56 at FIG. 8, projects beyond the plane of the annular lip 38. A straight edge 54 displaced across the surface of the annular lip 38 is consequently lifted while sliding over the portion 56 of the exterior surface of the retainer cap 40 projecting beyond the plane of the lip 38. After the full ball and socket joint 60' has reached the end of its useful life, the straight edge 54, FIG. 9, may be slipped across the face of the retainer lip 38 without engaging the farthest projecting portion 56 of the exterior surface of the pre-load retainer cap 40, thus indicating that it is time to replace the ball and socket joint 60'.

Figure 10:
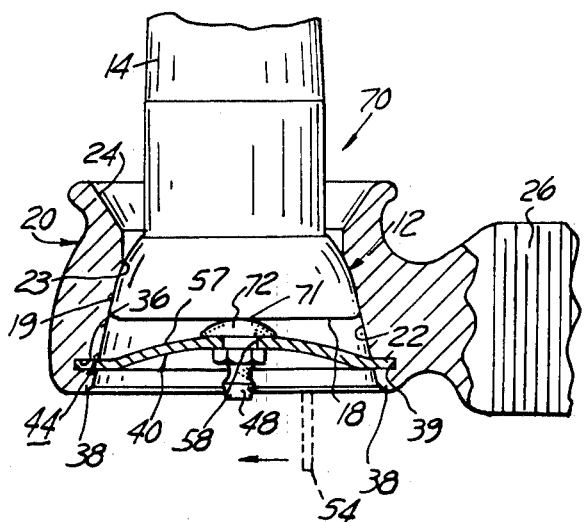
FIGS. 10 and 11 are views similar to FIGS. 1 and 2, but showing another modified structure of the half-ball and socket type.
Figure 11:
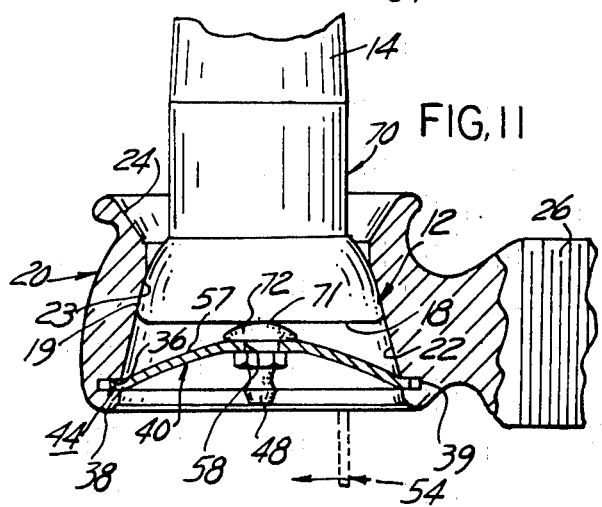

Referring to FIGS. 10–11, an example of structure for a knuckle or swivel joint 70, as disclosed in application Ser. No. 292,634, comprises a stud 14 provided at one end with an integral cold headed half-ball 12 having a peripheral convex surface 19 and a flat end face 18. The half-ball 12 is disposed within a socket member 20 provided with a shank 26 fastened to the periphery of the socket member 20 by any convenient means, such as by friction welding for example. The socket member 20 has a bore 22 from which projects, at one end, the stud 14 of the stud and half-ball unit. The peripheral convex spherical surface 19 of the half-ball 12 slidingly engages an inner concave spherical surface portion 23 formed in the bore 22 of the socket member 20. The half-ball 12 and its attached stud 14 are capable of swivelling relative to the socket member 20. The bore 22 of the socket member 20 has an open end 24 through which projects the stud 14.

A dished retainer cap 40, made of resilient spring metal in the form of a disk and having a convex face 57 disposed toward the flat end face 18 of the half-ball 12 closes the other end of the socket bore 22. The retainer cap 40 is held in position at the other end of the bore 22 of the socket 20 by an inwardly radially bent lip 38, such that the peripheral flange 44 of the retainer cap 40 is held in a groove 39 formed between the lip 38 and an annular shoulder surface 36 in the socket bore 22 proximate its other end. The retainer cap 40 has a centrally disposed aperture 58 in which is press-fitted or otherwise mounted a grease fitting 48. The grease fitting 48 has an enlarged foot 71 having a convex end face 72 and forming a bearing button urged against the flat end face 18 of the half-ball 12 as a result of elastic deformation and partial flattening of the dished retainer cap 40 during formation, by swaging, of the cap retaining lip 38. In this manner, a pre-load force is applied by the retainer cap through the convex end face 72 of the grease fitting 48 to the spherical bearing surfaces 19 and 23. In the structure disclosed, the grease fitting 48 may eventually be used to replenish the reserve of lubricant present between the retainer cap 40 and the flat end face 18 of the half-ball 12.

The elements forming the half-ball and socket 70 are so dimensioned, and more particularly the length of the grease fitting 48 is so dimensioned, that when the half-ball and socket joint 70 is new a straight edge 54 being slipped across the annular surface of the lip 38 of the socket 20 encounters the projecting tip of the grease fitting 48. When the bearing surfaces in engagement have worn to the point that a straight edge 54 displaced across the surface of the lip 38 no longer encounters the tip of the grease fitting 48, as a result of the tip of the grease fitting 48 having retracted beyond the plane of the lip 38, FIG. 11, this indicates that it is time to replace the worn joint by a new one.

The structure of FIGS. 10–11 is readily adaptable to knuckle or swivel joints of the dry type or of the lubricated-for-life type, simply by replacing the grease fitting 48 by a rod, formed integral with the bearing button 71 and projecting through the aperture 58 in the pre-load retainer cap 40, such as to normally project beyond the plane of the annular lip 38 when the ball and socket joint is new, and below the surface of the annular lip 38 when the half-ball and socket joint 70 has worn beyond its useful life term. A similar structure is illustrated at 70' at FIGS. 12 and 13 wherein the bearing button 71 is provided with a stem 74 passed through the aperture 58 in the pre-load retainer cap 40 and which has a tip 76 normally projecting through an aperture 77 in a disk plate 78 when the half-ball and socket joint 70' is new. The disk plate 78 is mounted at its marginal edge in the groove 39 below the lip 38, together with the marginal flange 44 of the pre-load retainer cap 40. The length of the stem 74 is such that when the half-ball and socket joint 70' reaches the end of its useful life, the tip 76 of the stem 74 disappears below the outer surface of the disk plate 78. The structure of FIGS. 12–13 therefore provides a half-ball and socket joint 70' with a wear indicator which can be checked by hand feel. As long as the end 76 of the stem 74 projects through the aperture 77 in the plate 78, the joint may be left where installed, but when checking reveals that the tip 76 of the pin stem 74 no longer projects beyond the plate 78, the joint needs replacement.

Figure 14:
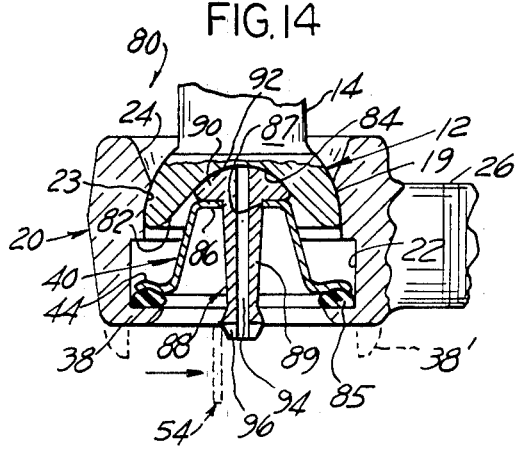
FIGS. 14-15 are longitudinal sections through an example of ball and socket joints of novel structure provided with a built-in wear indicator according to the present invention.
Figure 14A:
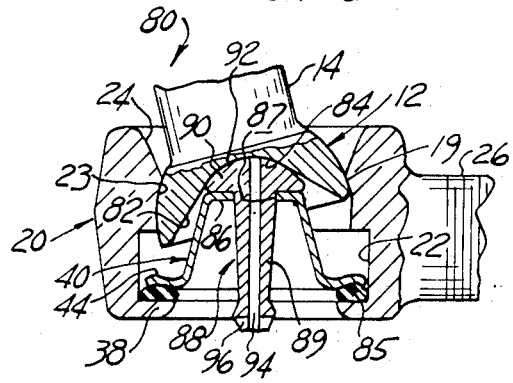
Figure 15:
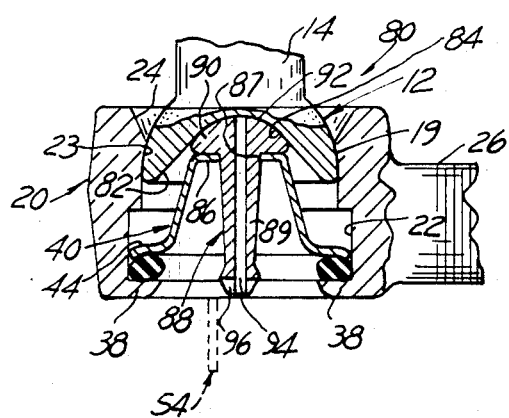

Referring now to FIGS. 14–15 illustrating an example of structure for a knuckle or swivel joint 80 particularly well adapted to accomplish the object of the present invention, the joint 80 comprises a cold-headed half-ball 12 having a projecting stud 14 formed integrally at one end thereof the half-ball 12 being swivellingly disposed in a socket 20. The end of the half-ball 12 has a partially spherical surface portion 19 in swivelling engagement with a mating spherical surface 23 formed in the bore 22 of the socket 20 proximate the open end 24 thereof through which projects the stud 14. A cup-shaped pre-load retainer cap 40 having an annular peripheral flange 44 is held at the other end of the bore 22 in the socket 20 by a lip 38 formed by bending over the socket rim 38', shown in dashed lines, such as to form the lip 38, an elastomeric O-ring 85 being compressibly held between the lip 38 and the peripheral flange 44 of the cup-shaped retainer cap 40. The cup-shaped retainer cap 40 has a flat end wall 86 provided with a centrally disposed aperture 87 through which is disposed a grease fitting 88 having a stem 89 and an enlarged end or foot portion 90 provided with a spherical surface 92 in engagement with the concave spherical surface 84 in the conical cavity 82 of the half-ball 12. The elastic deformation and compression of the elastomeric O-ring 85 generally combined with a slight elastic deformation of the flange 44 of the cup-shaped closure cap 40, biases the end wall 86 of the closure cap 40 and consequently the spherical surface 92 of the enlarged end or foot portion 90 of the grease fitting 88 in firm engagement with the spherical portion 84 of the cavity 82 in the half-ball 12, and the peripheral spherical surface 19 of the half-ball 12 in engagement with the spherical surface 23 of the socket bore 22. A channelway 94 is provided through the center of the stem 89 of the grease fitting 88 to supply grease to the interior of the socket 20 between the closure cap 40 and the half-ball 12 to lubricate the bearing surfaces in swivelling engagement, by means of a grease gum, not shown, fitting the tip 96 of the stem 89. Preferably, the channelway 94 does not have a check valve preventing reverse flow of grease therethrough, the engagement of the spherical end face 92 of the enlarged portion or foot 90 of the grease fitting 88 in engagement with the spherical concave surface 84 in the half-ball cavity 82 normally acting as a check valve, with the added feature that when the half-ball 12 and stud 14 assembly is angulated, as shown at FIG. 14a, excessive grease in the space between the half-ball 12 and the retainer cap 40 is eliminated without causing hydraulic lock as a result of the pressure lifting the spherical surface 92 of the grease fitting foot portion 90 against the pre-load force exerted by the compression O-ring 85 from the concave spherical surface 84, thus allowing surplus grease to reverse flow through the channelway 94 and relieving the internal pressure that may cause hydraulic lock.

The length of the stem 89 of the grease fitting 88 is such that the end of the tip 96 of the grease fitting projects beyond the plane of the socket retaining lip 38, when the joint 80 is new. A straight edge 54 being diametrically translated over the end of the socket 20 in sliding engagement with the surface of the lip 38 is enabled to slip across without interference only after the end of the grease fitting tip 96 is flush with, or below, the plane of the surface of the lip 38, FIG. 15. When such condition is observed, which indicates wear of the bearing surfaces in engagement and more particularly of the ball spherical surface 19 and socket internal spherical surface 23, beyond an acceptable limit, the joint 80 should be replaced.

Figure 16:
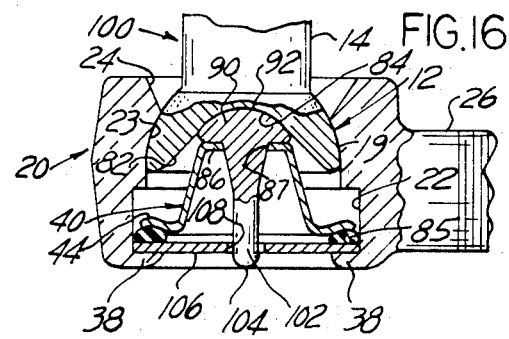
FIGS. 16 and 17 are views similar to FIGS. 14 and 15, but illustrating a modification thereof, without grease fitting.
Figure 17:
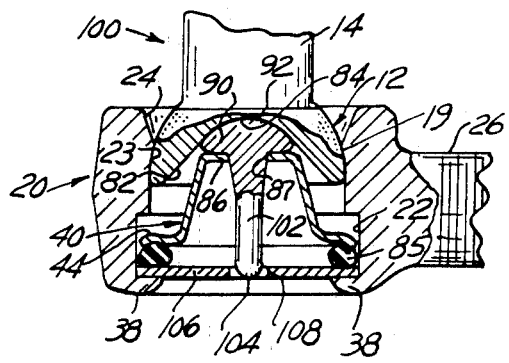

The structure of FIGS. 14–15 is readily adaptable to knuckle or swivel joints of the dry type and of the lubricated-for-life type such as illustrated at 100 at FIGS. 16–17, the grease fitting being replaced by a rod 102 substantially shaped like the grease fitting 88 of the structure of FIGS. 14–15, but without the grease channelway and the grease gun fitting tip. The rod 102 could be made with a length such that its tip 104 would interfere with a straight edge being passed transversely over the surface of the socket lip 38, when the knuckle or swivel joint 100 is new, and let the straight edge pass over freely without interference, when the knuckle or swivel joint 100 has reached the end of its useful life. Preferably however, the joint 100 is provided with a disk plate 106 installed between the inner face of the socket lip 38 and the elastomeric O-ring 85. The disk plate 106 has an aperture 108 at its center through which the tip 104 of the rod 102 projects, when the joint is new, FIG. 16, and which is retracted at least flush with the outer surface of the disk plate 106 when the joint is worn, FIG. 17. Therefore, the condition of the joint 100 may be easily checked simply by finger feel, determining whether or not the tip 104 of the rod 102 projects beyond the outer surface of the disk plate 106. When the rod tip 104 no longer projects, replacement of the joint is required.

Figure 12:
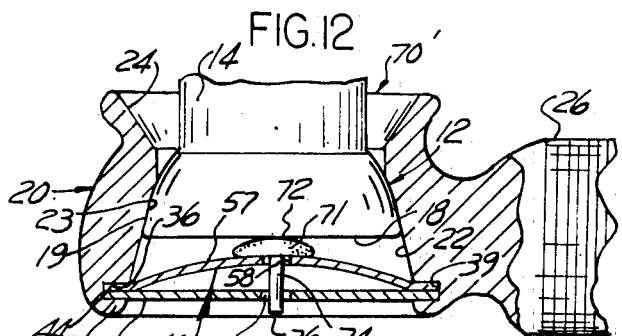
FIGS. 12 and 13 are views similar to FIGS. 10 and 11, but showing a modification thereof.
Figure 13:
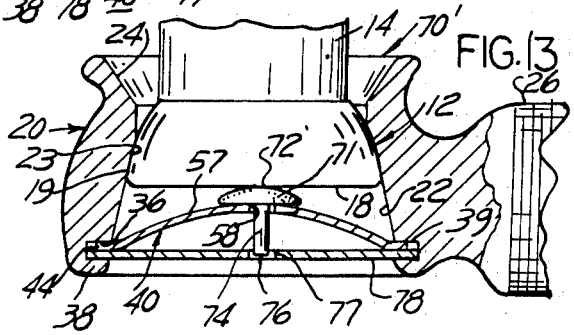

It will be readily appreciated that is structures of ball and socket joints provided with a grease fitting, the tip of the grease fitting may be arranged to project through an aperture in a plate, such as the plate 78, FIGS. 12–13, or the plate 106, FIGS. 16–17, a predetermined finite distance when the joint is new, and a lesser finitedistance when the joint needs replacement such that a grease gun is prevented from fitting over the tip through interference with the plate surface.

Having thus described the present invention by way of structural examples thereof well designed to accomplish the objects thereof, modification whereof will be apparent to those skilled in the art, what is claimed as new is as follows:

1. A knuckle joint comprising a socket member, a bore in said socket member, a spherical surface in said bore, a ball and stud integral assembly disposed through said bore with said stud projecting through one end of said bore, a spherical surface on said ball in swivelling bearing engagement with said spherical surface in said bore, a flat surface in said ball opposite to said stud, a cup-shaped retainer cap having an end closed by an end wall and another end open, a partially spherical surface on said end wall of said retainer cap in engagement with said flat surface on said ball, biasing means urging said retainer cap in a diretion urging all said spherical surfaces in mutual engagement and an elongate member attached at said end wall and projecting from said retainer cap through the open end thereof a finite distance when said joint is new and of a lesser finite distance when said joint needs replacement due to wear of said bearing spherical surfaces.

2. The knuckle joint of claim 1 further comprising a disk plate closing the other end of said socket member and an aperture in said disk plate, wherein said elongate member has a tip projecting substantially flush with an outer edge of said aperture when said joint needs replacement due to wear of said bearing spherical surfaces.

3. The joint of claim 1 wherein said biasing means comprises an elastomeric member held in compression between said retainer cap at the open end thereof and a retaining lip formed at the other end of said bore.

4. The joint of claim 1 further comprising an aperture in said end wall, said elongate member being in the form of a rod disposed through said aperture and having an enlarged foot portion defining said partially spherical surface, said rod having a tip projecting through the open end of said retainer cap said finite distance when said joint is new and said lesser finite distance when said joint needs replacement due to wear of said bearing spherical surfaces.

5. The joint of claim 4 further comprising a closure plate mounted in said bore at said other end in a stationary position and an aperture in said plate, whereby said rod tip projects through said aperture when said joint is new, and retracts below an outer edge of said aperture when said joint needs replacement.

6. The joint of claim 4 wherein said rod has a channelway longitudinally disposed therein and said tip is in the form of a grease fitting for engagement with a grease gun.

7. A knuckle joint provided with a built-in wear indicator, said knuckle joint comprising a socket member, a bore in said socket member, a spherical surface in said bore, a ball and stud integral assembly disposed through said bore with said stud projecting through one end of said bore, a spherical surface on said ball in swivelling bearing engagement with said spherical surface in said bore, a recess in said ball opposite to said stud, a substantially spherical surface in said recess, a cup-shaped retainer cap having an end closed by an end wall and another end open, a partially spherical surface on said end wall of said retainer cap in engagement with said partially spherical surface in said cavity in said ball, biasing means urging said retainer cap in a direction urging all said spherical surfaces in mutual engagement, and an elongate member attached at said end wall and projecting from said retainer cap through the open end thereof a finite distance when said joint is new and a lesser finite distance when said joint needs replacement.

8. The joint of claim 7 wherein said biasing means comprises an elastomeric member held in compression between said retainer cap at the open end thereof and a retaining lip formed at the other end of said bore.

9. The joint of claim 7 further comprising an aperture in said end wall, said elongate member being in the form of a rod disposed through said aperture and having an enlarged foot portion defining said spherical surface, said rod having a tip projecting through the open end of said retainer cap said finite distance when said joint is new and said lesser finite distance when said joint needs replacement due to wear of said bearing spherical surfaces.

10. The joint of claim 7 further comprising a closure plate mounted in said bore at said other end in a stationary position and an aperture in said plate, wherein said elongate member has a tip projecting through said aperture when said joint is new and retracted below an outer edge of said aperture when said joint needs replacement.

11. The joint of claim 7 wherein said elongate member has a channelway longitudinally disposed therein and said tip is in the form of a grease fitting for engagement with a grease gun.

12. The joint of claim 8 further comprising an aperture in said end wall, said elongate member being in the form of a rod disposed through said aperture and having an enlarged foot portion defining said spherical surface, said rod having a tip projecting through the open end of said retainer cap said finite distance when said joint is new and said lesser finite distance when said joint needs replacement due to wear of said bearing spherical surfaces.

13. The joint of claim 9 further comprising a closure plate mounted in said bore at said other end in a stationary position and an aperture in said plate, wherein said rod tip projects through said aperture when said joint is new and retracts below an outer edge of said aperture when said joint needs replacement.

14. The joint of claim 9 wherein said rod has a channelway longitudinally disposed therein and said tip is in the form of a grease fitting for engagement with a grease gun.

15. The joint of claim 10 wherein said rod has a channelway longitudinally disposed therein and said tip is in the form of a grease fitting for engagement with a grease gun.

16. The knuckle joint of claim 7 further comprising a disk plate closing the end of said socket and an aperture in said disk plate, wherein said elongate member has a tip projecting through said aperture a finite distance when said joint is new and a lesser finite distance when said joint needs replacement due to wear of said bearing spherical surfaces.

* * * * *